United States Patent
Halstead et al.

[15] 3,666,313
[45] May 30, 1972

[54] PARTITION FOR AUTOMOBILES

[72] Inventors: Robert E. Halstead; Harold A. Halstead, both of c/o Novelty Carriage Works, Inc., East 6615 Main, Spokane, Wash. 99200

[22] Filed: July 28, 1970

[21] Appl. No.: 58,857

[52] U.S. Cl. ............................................296/24 R, 49/250
[51] Int. Cl. ...............................................B60d 33/04
[58] Field of Search................296/24 R, 85; 49/252, 253, 49/246, 250

[56] References Cited

UNITED STATES PATENTS

| | | | |
|---|---|---|---|
| 3,441,309 | 4/1969 | Halstead et al. | 296/24 R |
| 2,108,289 | 2/1938 | Laddon | 49/250 X |
| 3,015,515 | 1/1962 | Halstead et al. | 296/24 R |
| 3,214,211 | 10/1965 | Setina | 296/24 R |
| 3,510,164 | 5/1970 | Setina | 296/24 R |

Primary Examiner—Benjamin Hersh
Assistant Examiner—John A. Pekar
Attorney—Wells, St. John & Roberts

[57] ABSTRACT

A partition apparatus mounted immediately behind the front seat of an automobile for protecting those in the front seat from physical contact by persons in the rear of the vehicle. It includes an inverted roll bar having a solid transverse plate extending across the back of the front seat. A movable partition is selectively positioned in an upper location extending across the space between the roll bar and the top of the plate. It is movable to a lowered or retracted position by means of a pivot arm and lower slide connection, combining pivotal and translational movement to minimize projection of the partition rearward of the roll bar during movement of the partition. The partition is spring-biased to its upper position.

4 Claims, 7 Drawing Figures

PATENTED MAY 30 1972 3,666,313

INVENTOR.
Robert E. Halstead
Harold A. Halstead
BY
Wells, St. John & Roberts
Attys.

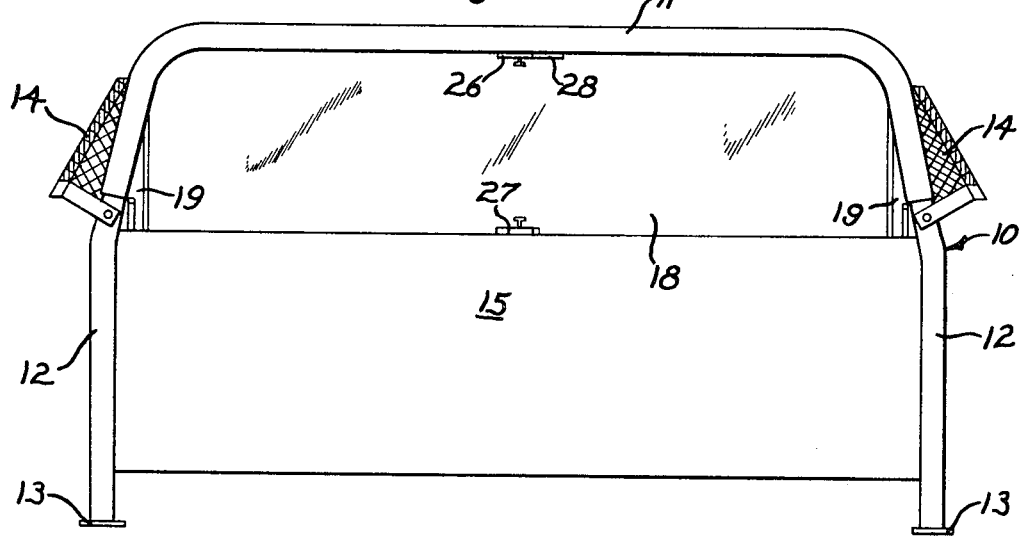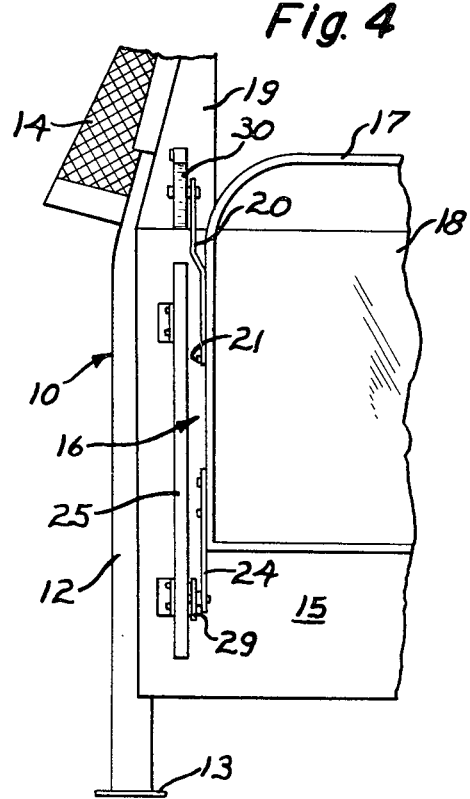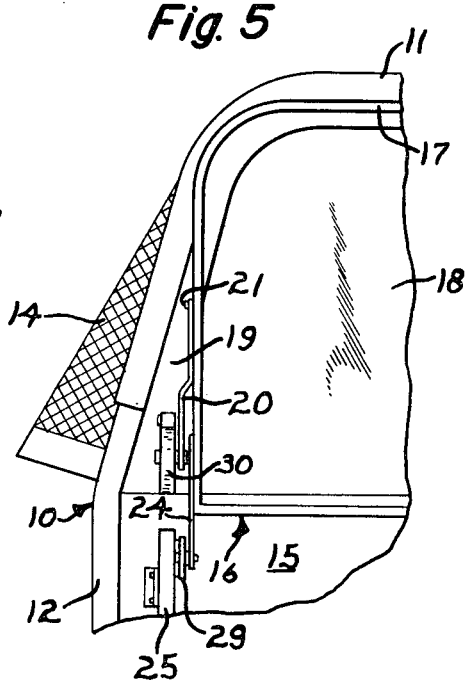

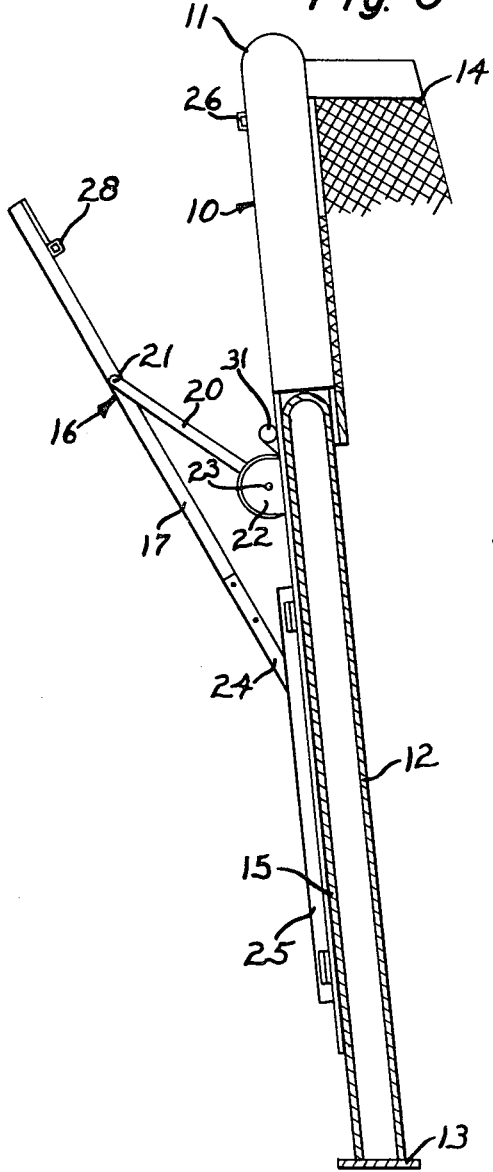
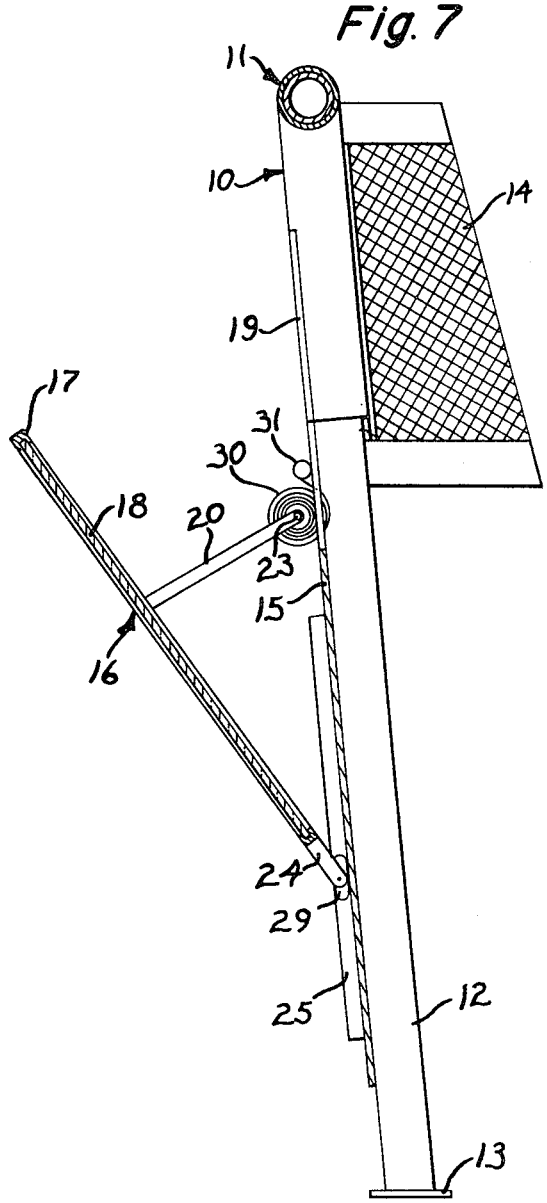

PARTITION FOR AUTOMOBILES

BACKGROUND OF THE INVENTION

The present apparatus stems from efforts to provide a protective roll bar and movable partition immediately rearward of the front seat of a sedan-type vehicle. Such partitions are used to physically separate the front and rear seat areas so as to isolate persons in the rear seat from the operator of the automobile. Such partitions are particularly adaptable to law enforcement vehicles, although the application of the partition is not be be restricted to such uses.

In law enforcement work, it is sometimes necessary to transport prisoners in sedan vehicles. Isolation of the rear seat area is desirable so as to protect the operator of the car from attack by the prisoner or prisoners being transported. This becomes particularly important when the operator is not assisted by another person while driving the vehicle. Partitions have been used in a stationary position, but stationary partitions interfere with other uses of the vehicle and, when involving a partition of solid material, interfere with normal air circulation. It is therefore desirable to provide a partition which may be moved to and from an operational position so as to render the vehicle more suitable for a variety of purposes.

Several difficulties have arisen in the practical application of mounting moving partitions to such vehicles. An early example of a movable partition is shown in U.S. Pat. No. 2,884,279, which illustrates parallel arms pivotally mounting an upright partition. Such partitions are still in wide use and can be used in vehicles where there is adequate clearance for the outwardly projected partition during movement of the partition from one position to another. However, the amount of room available for such swinging movement has been gradually decreased in modern vehicles, and it becomes difficult to accommodate movement of a partition of this type, particularly in smaller sedans. U.S. Pat. Nos. 3,015,515 and 3,441,309 show sliding arrangements for guiding the sides of the partition within a track. While such a partition solves the space problems, the tracks themselves have posed difficulties in alignment and installation, and such partition units have sometimes been rendered inoperative due to failure of the track guide assemblies. A similar situation is involved in the apparatus shown in U.S. Pat. No. 3,214,211.

The present mounting arrangement for removable partitions combines the best features of all prior devices in a unique arrangement making use of a pivoted partition with its lower end guided along a track. Movement of the partition does not interfere with the area extending from the front upper corner of the rear seat cushion to the back surface of the front seat. This is the area of greatest constriction. Prior swinging movement of a partition about a fixed pivot have previously required that no occupants be in the rear seat of the vehicle during partition movement, since their legs would interfere with the movement of the partition. The present apparatus can be moved from an operative to an inoperative position without interference by a person seated on the rear seat of the vehicle.

SUMMARY OF THE INVENTION

The invention comprises a roll bar assembly having an upper portion and side legs. A transverse partition is selectively located in an upright attitude across the top of the roll bar. It is supported by a pivoted crank arm at each side connected to the partition and to the roll bar about horizontal axes. The lower end of each partition is pivotally guided by upright longitudinal tracks which maintain its path of movement along a line parallel to the roll bar.

It is a first object of this invention to provide a rigid roll bar and movable partition assembly which can be shipped from one location to another and readily installed within the vehicle without binding the moving components of the assembly.

Another object of the invention is to provide a pivotally moveable partition whose movement is not impeded by a person seated on the rear seat of the vehicle in which it is installed.

Another object of this invention is to provide an effective spring-biased partition for automatic raising of the partition to its operative position.

These and other objects will be evident from the following disclosure taken together with the accompanying drawings, which illustrate a preferred form of the invention. It is to be understood that the illustrated details are not intended to limit the extent of the invention itself.

BRIEF DESCRIPTION OF THE DRAWINGS

FIG. 3 is a front view of the roll bar and partition;

FIG. 4 is an enlarged rear view taken at one side of the partition, the partition being shown in its lowered position;

FIG. 5 is a view similar to FIG. 4, showing the partition in its raised position;

FIG. 6 is an enlarged sectional view taken along line 6—6 in FIG. 2, showing the partition moved slightly from its upper operational position; and FIG. 7 is an enlarged sectional view taken along line 7—7 in FIG. 2, showing the partition pivoted slightly from its lower storage position.

DESCRIPTION OF THE PREFERRED EMBODIMENT

Figure 1:
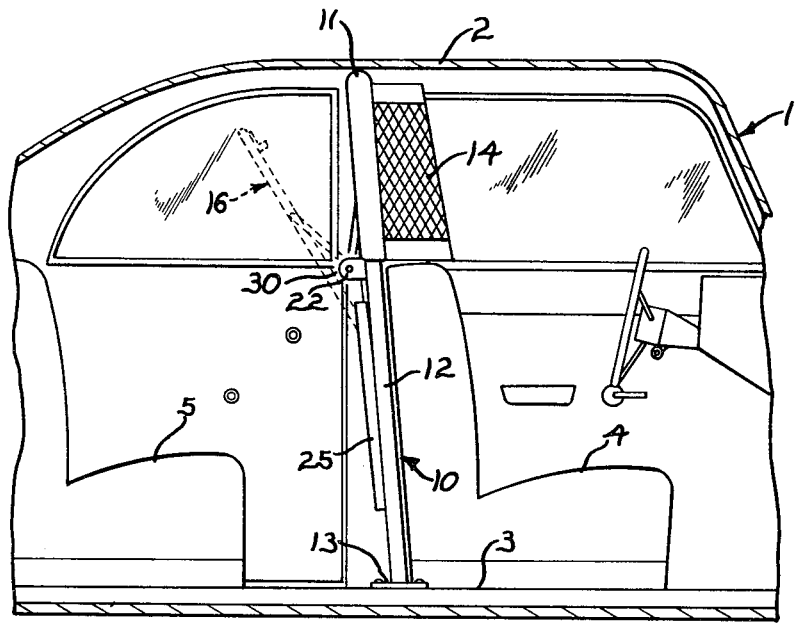
FIG. 1 is a side elevation view of the partition and roll bar assembly mounted within a vehicle, the vehicle being shown in section.
Figure 2:
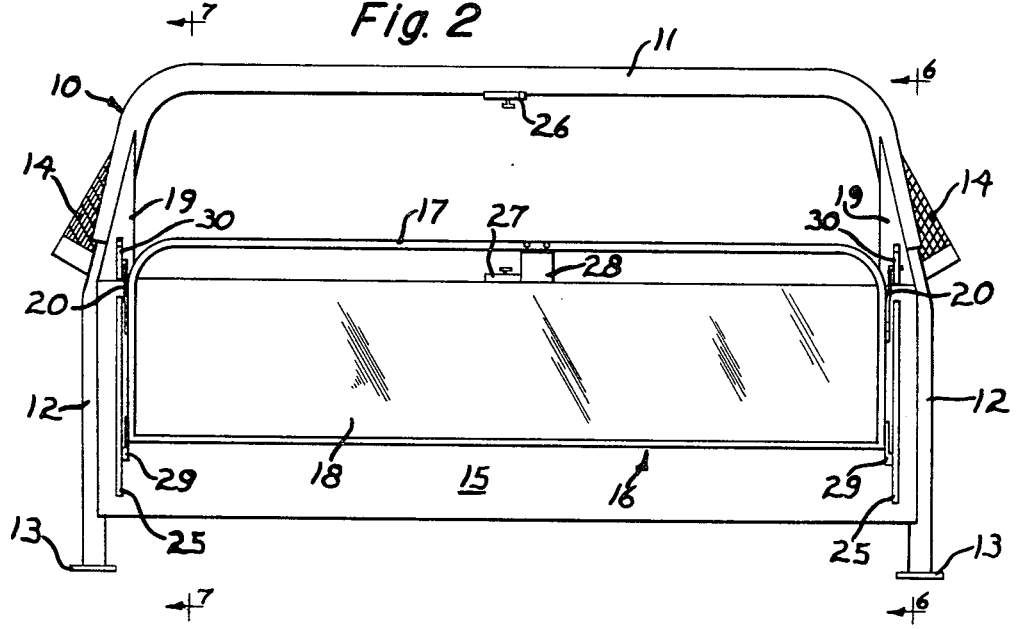
FIG. 2 is a rear view of the roll bar and partition.

FIGS. 1, 2, and 3 illustrate the roll bar and partition in complete assembly. FIG. 1 illustrates the manner by which the roll bar and partition are utilized within a vehicle interior to provide isolation between the front and rear seat areas. In FIG. 1, the numeral 1 indicates a general body of a sedan-type vehicle including a roof 2 and floor 3. The front seat of the vehicle is shown at 4 and the rear seat at 5. Because the present partition is suitable for installation in any normal-sized vehicle of this type, the specific details of the vehicle itself are not believed to be further necessary to an understanding of the present apparatus.

The movable partition is mounted in a stationary roll bar assembly 10 formed of tubular steel having sufficient strength to serve as a reenforcement structure at the center of the vehicle. A roll bar is particularly important in highway vehicles used by law enforcement officers, where high speed roll-overs are rather frequent. While the essential portion of this disclosure relates to the mounting of the partition, in practical use, the combination of the partition and roll bar has been found to be desirable and widely accepted, due to the additional safety afforded by the reenforcement of the vehicle body 1. The roll bar assembly 10 includes a substantially horizontal top portion 11 and integral side portions or legs 12. Fixed at the bottom end of each leg 12 is a rigid base 13 adapted to be bolted or otherwise secured to the floor 3 of the vehicle. At each side of the roll bar assembly are adjustable grills 14 which project transversely and forwardly to fit against the various configurations encountered at the interior sides of such vehicles. Grills 14 provide ventilation between the front and rear seat areas when the partition is in its raised position.

The roll bar assembly 10 is substantially reenforced by a rigid metal plate 15 positioned in an upright orientation and extending across the legs 12 rearwardly adjacent to the front seat 4 of the vehicle in which the unit is installed. The plate 15 rigidly connects the otherwise open end of the inverted U-shaped roll bar to prevent bending or damage during shipment. When installed in the vehicle, it provides substantial protection to occupants in the front seat of the vehicle by preventing use of knives or other weapons which might otherwise be projected through the front seat to injure persons sitting thereon. As shown, triangular plates 19 are fixed at each side of the unit as upper extensions of the plate 15. They serve to partially enclose the space within the upper section of the roll bar assembly 10 and to permit the use of a substantially rectangular partition.

The partition assembly 16 includes a generally rectangular metal frame 17 mounting a sheet of transparent material indicated at 18. The transparent sheet 18 is preferably made of a clear plastic resin. It might alternately be glass, expanded metal, or any transparent or semi-transparent material capable of providing the necessary physical barrier. The partition might be constructed in sections with one or more sections screened or partially open for ventilation purposes. The most widely used partition material at this time is a solid sheet of transparent plastic resin.

The partition assembly 16 is movably carried by the components best seen in FIGS. 4–7. The elements are identical at each side of the partition, one side being the mirror image of the other.

The partition is pivotally carried by rigid crank arms 20 pivoted at 21 to the partition assembly 16 at its approximate mid-elevation. The outer end of each crank arm 20 is pivoted at 23 to a bracket 22 fixed to and projecting slightly from the plate 19. The lower end of the partition assembly is provided with co-extensive brackets 24 at each side, which pivotally connect a slide 29 guided within an upright track 25 fixed to and extending parallel with the plate 15 beneath the bracket 22. The pivotal connections between the bracket 24 and slide 29 are centered about a transverse horizontal axis parallel to the pivotal axes at the respective ends of crank arms 20.

FIGS. 1, 6 and 7 illustrate the manner by which the partition assembly 16 moves from its upper position, located between the top portion 11 of the roll bar and the top of plate 15, to its lower, or storage position. The upper end of the partition assembly swings rearwardly in an arc defined by the path of movement of crank arms 20 about pivots 21 and the translational movement of slides 29 along tracks 25. During downward movement of the partition assembly 16, the top end of the partition swings outwardly until the crank arms 20 attain a horizontal position, and then begins to move forwardly in an arc. The lower end of the partition remains substantially against the plate 15, and the total rearward projection of the partition decreases as it approaches its lowered position substantially abutting the plate 15. As the partition assembly 15 is raised from the storage position to the upper operative position, this movement is simply reversed. This particular mounting arrangement provides controlled movement of the partition while minimizing interference with the normally restricted leg room available at the back seat of the sedan-type vehicles.

To facilitate upward movement of the partition assembly 16 from its storage position, spiral springs 30 are centered about the pivots 21 at each side of the partition assembly 16. The inner end of each spring 30 is fixed relative to the crank arm 20 associated therewith. The outer end of each spring 30 is anchored at 31 to the fixed plate 15 at that side of the unit. The spring 30 is wrapped in a direction such as to urge the crank arms 20 from their pivots 21 in a clockwise direction as seen in FIGS. 1, 6 and 7.

To maintain the partition assembly in its respective positions, a common apertured bracket 28 is fixed to the front surface of the partition frame 17 at its upper edge. It is selectively engaged by manually operated bolt latches 26 and 27, mounted on the front surfaces of the roll bar and upright plate respectively. The latches 26, 27 comprise spring-biased bolts, normally urged to a projecting position so as to be received within the aperture of bracket 28. When the partition assembly 16 is raised, the latch 26 prevents movement of the partition until it is released by an occupant of the front seat. When the partition is in a lowered or storage position, latch 27 prevents the springs 30 from returning the partition to its raised position. However, when raising of the partition is desired, this can be accomplished from the front seat by simply releasing latch 27, movement of the partition assembly 16 then being effected automatically by operation of springs 30 as described above.

Various minor changes might be made in the specific arrangement as shown and described, without basically changing the concepts with which this disclosure is concerned. For these reasons, only the following claims are intended as definitions of the invention disclosed herein.

Having thus described our invention, we claim:

1. A transverse safety partition apparatus adapted to be mounted rearwardly adjacent to the front seat of a vehicle, comprising:
   a roll bar assembly including substantially upright side portions and a substantially horizontal top portion;
   a transverse partition adapted to be selectively positioned in an upright attitude across the space immediately beneath the top portion of said roll bar assembly;
   rigid pivoted crank means at each side of said partition operatively connected to said partition and to said roll bar assembly about spaced parallel horizontal axes;
   means operatively connected between the lower end of said partition and said roll bar assembly for pivotally guiding the lower end of said partition along a straight upright path relative to said roll bar assembly;
   means operatively connected between the partition and said roll bar assembly for biasing the partition toward the position across the space immediately beneath the top portion of said roll bar assembly, said last-named means comprising a spiral spring centered about an axis of said crank means, having one end of the spring operatively connected to the roll bar assembly, and the remaining end operatively connected to said crank means.

2. A transverse safety partition apparatus adapted to be mounted rearwardly adjacent to the front seat of a vehicle, comprising:
   an upright frame adapted to be secured to the vehicle interior rearwardly adjacent to the front seat;
   a transverse partition adapted to be selectively located at a first upright position extending substantially across the vehicle interior immediately adjacent to the vehicle roof and movable to a second upright position elevationally lower than said first position;
   rigid crank means at each side of a said partition pivotally connected to said partition about a first horizontal transverse axis and to said frame about a second axis parallel to and spaced from said first axis;
   said first axis being elevated above said second axis when said partition is located at its first upright position relative to said frame;
   means operatively connected to said partition at locations elevationally below said first and second axes at each side of the partition and to said frame for guiding the lower end of said partition along a straight upright path relative to said frame;
   means operatively connected between the partition and said frame for biasing the partition toward the position adjacent to the vehicle roof, said last-named means comprising a spiral spring centered about an axis of said crank means, having one end of the spring operatively connected to the frame, and the remaining end thereof operatively connected to said crank means.

3. A transverse safety partition apparatus adapted to be mounted rearwardly adjacent to the front of a vehicle, comprising:
   a roll bar having a substantially horizontal top portion adapted to abut the vehicle roof and integral side portions extending downwardly therefrom at its respective ends adapted to extend to the vehicle floor adjacent the respective sides of the vehicle interior rearwardly adjacent to the front seat;
   a rigid plate fixed to and extending across the side portions of the roll bar, the upper edge of said plate being spaced elevationally beneath the top portion of said roll bar;
   a partition having a width extending substantially across the roll bar between its respective side portions and having a height substantially corresponding to the separation between the top portion of the roll bar and the upper edge of said plate;

and partition mounting means operatively connected between the roll bar and said partition for movably guiding the partition between a first upright position abutting the top portion of the roll bar and a second position spaced beneath the top portion of the roll bar;

said partition mounting means comprising:

rigid crank means at the respective sides of said partition, each pivotally connected to said partition about a first horizontal transverse axis and operatively pivoted to said roll bar about a second axis parallel to and spaced from said first axis, said first axis being elevated above said second axis when said partition is located at its first upright position relative to said roll bar, said rigid crank means comprising a pair or rigid arms located outwardly adjacent to the respective transverse sides of the partition, and biasing springs operatively connected between said roll bar and each of said arms urging said arms about their respective second axes in a direction such as to move the partition to its first upright position;

and means operatively connected to the lower end of said partition elevationally below said first and second axes and to said roll bar for guiding the lower end of said partition along an upright path that is substantially parallel to the side portions of the roll bar.

4. An apparatus as set out in claim 3 wherein the biasing springs comprise spiral springs centered about said second axes, one end of each spring being in engagement with the arm associated therewith and the remaining end being operatively anchored to the roll bar.

* * * * *